July 3, 1956  E. PELL  2,753,504
ADJUSTABLE VOLTAGE DRIVES FOR ELECTRIC MOTOR
Filed Nov. 22, 1954  4 Sheets-Sheet 1
Fig. 1
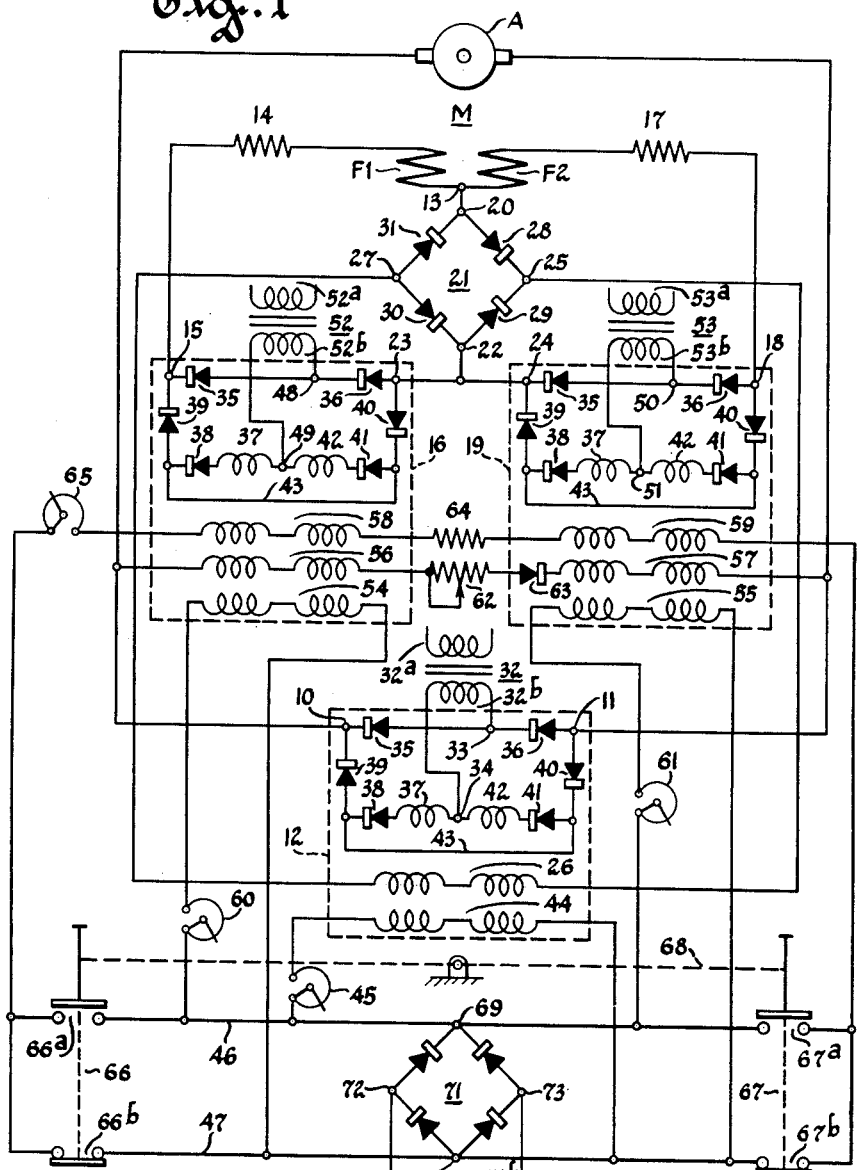
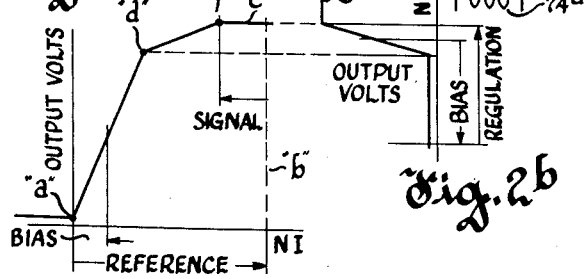
Fig. 2a  Fig. 2b
Inventor
Eric Pell
By H R Rather
Attorney

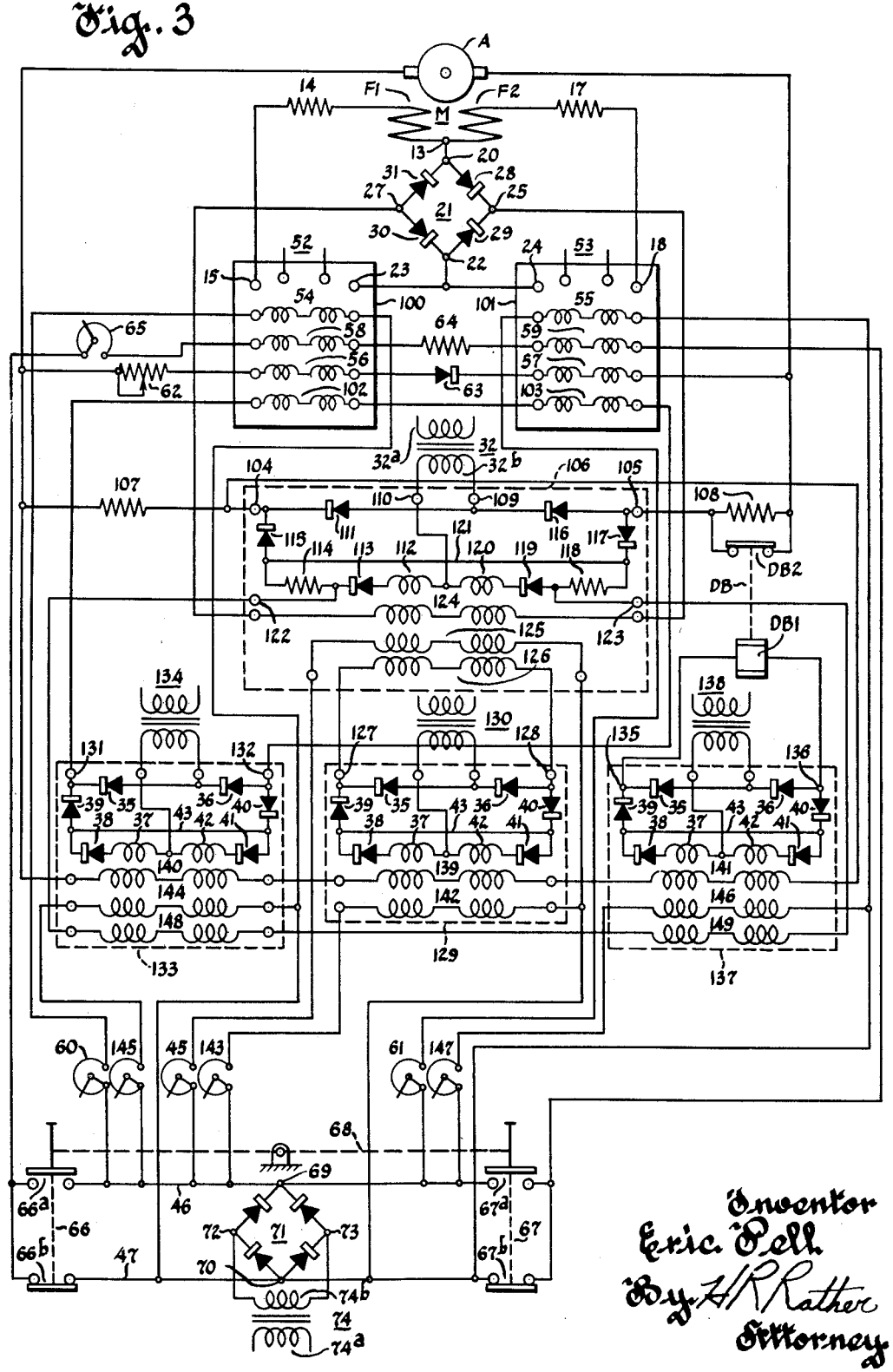

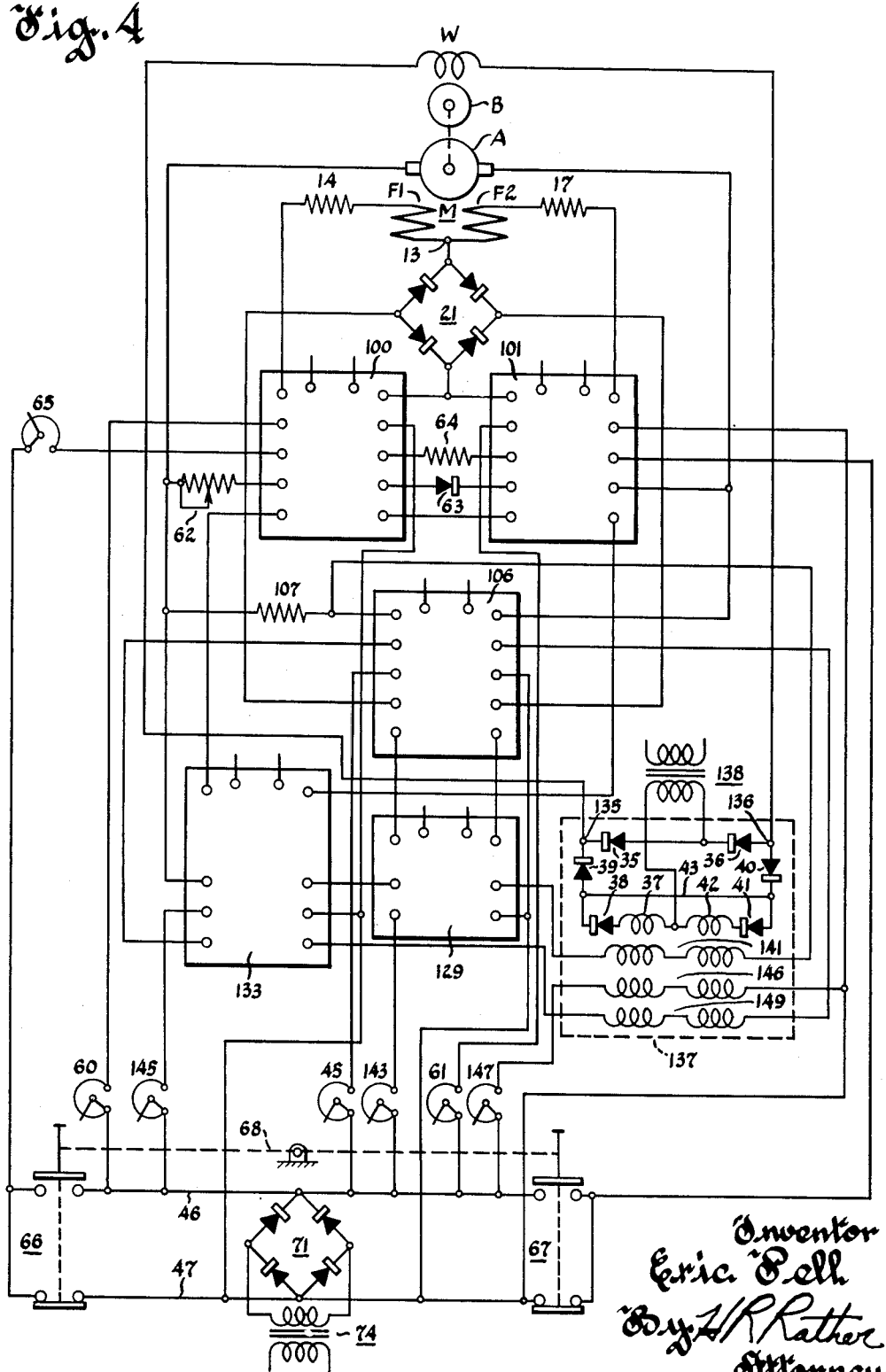

United States Patent Office 2,753,504
Patented July 3, 1956

2,753,504

ADJUSTABLE VOLTAGE DRIVES FOR ELECTRIC MOTOR

Eric Pell, Wauwatosa, Wis., assignor to Cutler, Hammer, Inc., Milwaukee, Wis., a corporation of Delaware Application November 22, 1954, Serial No. 472,166

15 Claims. (Cl. 318—297)

This invention relates to adjustable voltage drives.

It is a primary object of the present invention to provide improved reversible adjustable voltage drives utilizing rectified alternating current power amplifiers for supplying both the motor armature and field windings.

Another object is to provide drives of the aforementioned type which are further characterized by automatically insuring that the motor has substantially full field flux before voltage is applied across its armature.

A further object is to provide in connection with the aforementioned drives for automatic current limit during regenerative reversing operation.

Another object is to provide for automatic increase in braking torque during deceleration in regenerative reversing operation, and automatic removal of such braking torque at the end of deceleration, and A still further object is to provide automatic current limit during acceleration of such drives.

Other objects and advantages of the invention will hereinafter appear.

The accompanying drawings illustrate preferred embodiments of the invention which will now be described in detail, it being understood that the embodiments illustrated are susceptible of various modifications without departing from the scope of the appended claims.

In the drawings:

Figure 1 is a diagrammatic showing of an electric motor and a control system therefor incorporating the invention.

Figs. 2ª and 2ᵇ are curves depicting operating characteristics of certain apparatus of Fig. 1.

Fig. 3 is a diagrammatic showing of a modified form of the invention.

Fig. 4 is a diagrammatic showing of a second modified form of the invention.

Figure 5:
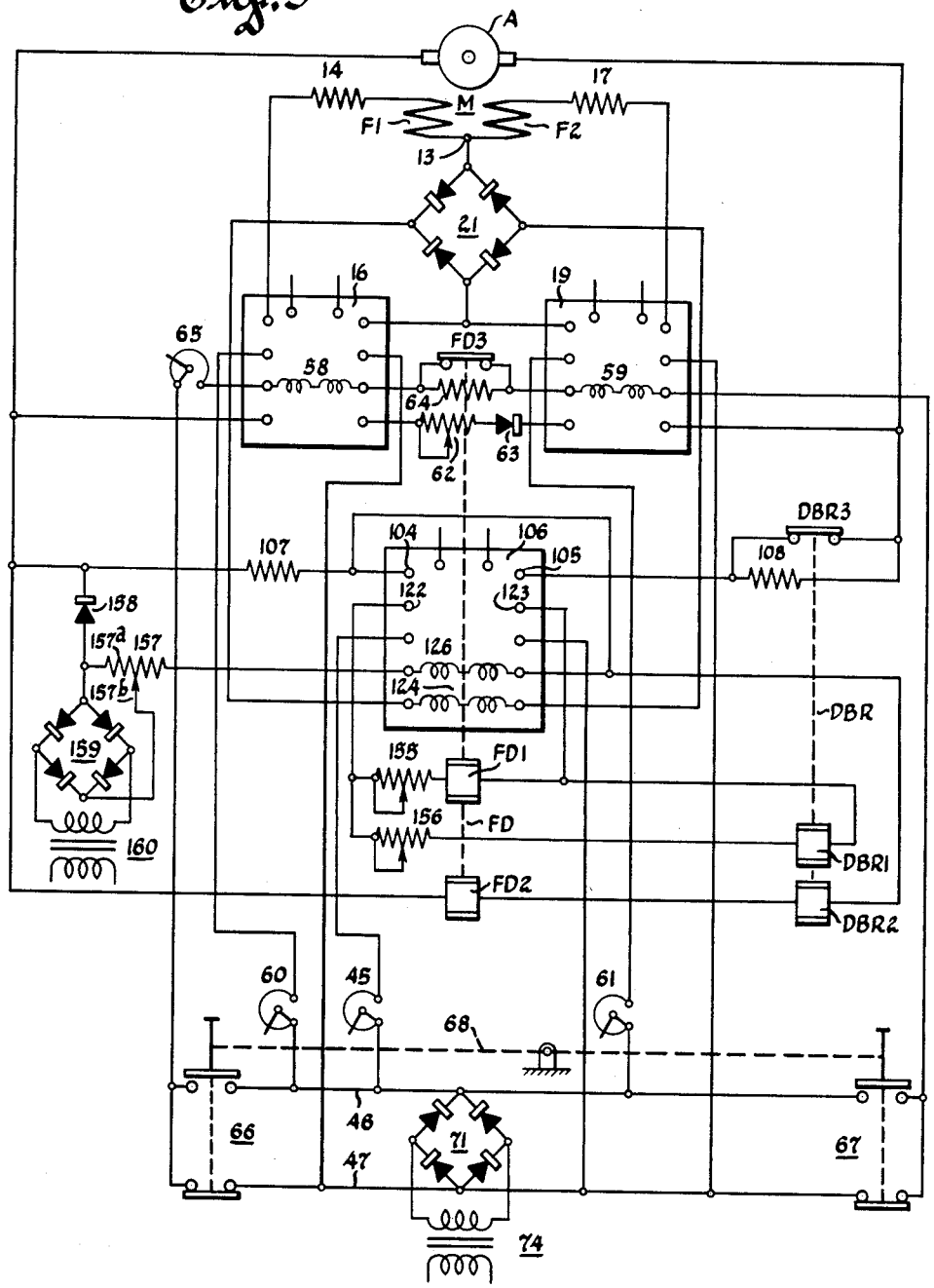
Fig. 5 is a diagrammatic showing of a third modified form of the invention.

Referring to Fig. 1, the letter M designates a D. C. motor having an armature A and a shunt field winding comprising the like, field winding sections F1 and F2. The armature A is connected in a loop circuit with the output terminals 10 and 11 of a magnetic amplifier 12. Field winding sections F1 and F2 are connected together at opposite ends to a common terminal 13. At its other end section F1 is connected in series with a resistor 14 to the output terminal 15 of a magnetic amplifier 16, and section F2 is connected at its other end in series with a resistor 17 to the ouput terminal 18 of a magnetic amplifier 19. Terminal 13 is connected to the terminal 20 of a rectifier bridge 21 whose diagonally opposite terminal 22 is connected to the other output terminals 23 and 24 of amplifiers 16 and 19, respectively. A third terminal 25 of rectifier bridge 21 is connected in series with the regulating control winding 26 of amplifier 12 to the diagonally opposite terminal 27 of rectifier bridge 21. Rectifier bridge 21 includes half-wave rectifier 28, 29, 30 and 31.

Magnetic amplifier 12, whose output voltage is impressed across armature A of motor M is provided with an A. C. input source comprising the transformer 32 having a primary winding 32ª and a secondary winding 32ᵇ. Winding 32ᵇ is connected to A. C. input terminals 33 and 34. Terminal 33 is connected in series with a half-wave rectifier 35 to output terminal 10, and output terminal 11 is connected in series with a similar rectifier 36 to terminal 33. Terminal 34 is connected in series with an A. C. main winding 37 and half-wave rectifiers 38 and 39 to output terminal 10, and output terminal 11 is connected in series with half-wave rectifiers 40 and 41 and a second A. C. main winding 42 to terminal 34. The point common between rectifiers 38 and 39, and the point common between rectifiers 40 and 41 are interconnected by a conductor 43. Amplifier 12 is also provided with a bias winding 44 which is connected at one end in series with an adjustable resistor 45 to a positive D. C. bus 46, and which is connected at its other end to a negative D. C. bus 47.

Magnetic amplifier 16 has A. C. input terminals 48 and 49, and magnetic amplifier 19 has A. C. input terminals 50 and 51. Terminals 48 and 49 are subjected to an A. C. voltage through secondary winding 52ᵇ of a transformer 52 having a primary winding 52ª, and terminals 50 and 51 are subjected to an A. C. voltage through secondary winding 53ᵇ of a transformer 53 having a primary winding 53ª. As the elements and connections in amplifiers 16 and 19, between their A. C. input terminals and output terminals, inclusive of all rectifiers, A. C. main windings, etc. are the same as that as for amplifier 12, corresponding elements have been given the same reference numerals. Amplifiers 16 and 19 are provided with D. C. bias windings 54 and 55, respectively, D. C. signal windings 56 and 57 respectively, and D. C. reference windings 58 and 59 respectively. Bias winding 54 is connected across buses 46 and 47 in series with an adjustable resistor 60, and bias winding 55 is connected in series with an adjustable resistor 61 across buses 46 and 47. The signal windings 56 and 57 of amplifiers 16 and 19 are connected in series with an adjustable resistor 62 and a half-wave rectifier 63 inserted therebetween, across the output terminals 10 and 11 of amplifier 12. Reference windings 58 and 59 of amplifiers 16 and 19, are interconnected at adjacent ends in series with a fixed resistor 64 and winding 58 at its other end is connected in series with an adjustable resistor 65 to the left hand contacts of normally open and normally closed contacts 66ª and 66ᵇ of a switch 66. The other end of winding 59 is connected to the right-hand contacts of normally open and normally closed contacts 67ª and 67ᵇ of a switch 67. The right hand contacts of contacts 66ª and 66ᵇ of switch 66 and left-hand contacts of contacts 67ª and 67ᵇ of switch 67 are connected to buses 46 and 47. Switches 66 and 67 are mechanically interlocked as depicted by the broken line 68.

The buses 46 and 47 are connected to the positive and negative terminals 69 and 70, respectively, of a full-wave rectifier bridge 71 which is connected through its A. C. terminals 72 and 73 to secondary winding 74ᵇ of a transformer 74 which has a primary winding 74ª.

With transformers 32, 52, 53 and 74 deenergized the device will be completely deenergized. If these transformers are all energized, switches 66 and 67 are in their operating position depicted in Fig. 1, and assuming adjustable resistors 60 and 61 have been given appropriate adjustments, amplifiers 16 and 19 will be biased off to minimum output as depicted by the point "a" on the characteristic magnetic amplifier output voltage vs. control ampere turn curve of Fig. 2ª, due to the "turn-off" ampere turns developed by these respective bias windings 54 and 55. Consequently, amplifiers 16 and 19 will supply a very small output current to field winding sections F1 and F2. As these currents will be in opposition the motor M will remain at rest.

If it is desired to operate the motor in the "forward" direction, switch 66 is operated to close its contacts 66$^a$ and open its contact 66$^b$. As a result direct current will flow from terminal 69 of rectifier bridge 71, through conductor 46, contacts 66$^a$, adjustable resistor 65, reference winding 58, resistor 64, reference winding 59, the then closed contacts 67$^b$ of switch 67, and conductor 47 to terminal 70 of the rectifier bridge. With current flow through winding 58 in that direction, and with resistor 65 appropriately adjusted, amplifier 16 will be turned "full-on" to a point where the ordinate "b" intersects the portion "c" of the amplifier output curve of Fig. 2$^a$. As aforementioned reference winding 59 of amplifier 19 is so wound with respect to its bias winding 55 that the current flow through winding 59 in the direction specified will keep amplifier 19 turned "full-off"; the ampere turns of winding 59 aiding the turn-off ampere turns of bias winding 55.

As amplifier 16 turns on, current flows from its output terminal 15 through resistor 14, field winding section F1, rectifier 28, regulator winding 26 of amplifier 12, and rectifier 30 to output terminal 23. By the time the output current has reached the value depicted by point "d" on the curve of Fig. 2$^a$ the ampere turns developed in winding 26 of amplifier 12 will counteract the ampere turns developed by bias winding 44 sufficiently to start turning amplifier 12 on.

As the output voltage of amplifier 16 rises to the value depicted by the portion "c" of the curve of Fig. 2$^a$, the output voltage of amplifier 12 increases to the value depicted by the portion "e" of Fig. 2$^b$ and the motor accelerates. By virtue of the output voltage of amplifier 12, ampere turns are developed in signal winding 56 of amplifier 16 which counteract the ampere turns developed by reference winding 58. Preferably, when the motor reaches base speed at rated load the net turn-on ampere turns should place the voltage output of amplifier 16 at, or somewhat just to the left of the point "f" on the curve of Fig. 2$^a$.

Assume that the motor is running at base speed and rated load. Now if the load on the motor is suddenly decreased there will be some imperceptibly small increase in motor speed and there will be an attendant decrease in current drawn by armature A. Consequently there will be some increase in output voltage of amplifier 12. This increases the ampere turns developed in signal winding 56 and the output voltage of amplifier 16 decreases to some intermediate value between points "d" and "f" on the curve of Fig. 2$^a$. Accordingly, there is a decrease in the energization of field winding section F1 and regulating control winding 26 of amplifier 12. Although the field flux is reduced, the reduced output voltage effected in amplifier 12, due to the higher gain of the latter, is sufficient to bring the motor substantially back to base speed before any appreciable increase in motor speed can occur.

If the motor is running as before at base speed with rated load, and the load on the motor is suddenly increased, the motor will imperceptibly decrease in speed. Consequently the motor C. E. M. F. decreases, and the armature A will draw increased current from amplifier 12, which results in a drop in output voltage of the latter. Accordingly, the ampere turns developed in signal winding 56 decreases, and the net turn-on ampere turns of amplifier 16 is thereby increased. Although amplifier 16 is in magnetically saturated condition, and but very small change in field strength of the motor occurs, increased current flows through field winding section F1, and regulator winding 26 of amplifier 12 to increase the voltage output across terminals 10 and 11 of amplifier 12. As a result the speed of motor M is brought substantially back to base speed before any appreciable decrease in speed can occur.

Now let it be assumed that the motor is running at base speed and it is desired to operate it in the "reverse" direction. Switch 66 is operated to open its contacts 66$^a$ and close its contacts 66$^b$, and switch 67 is thereafter operated to close its contacts 67$^a$ and open its contacts 67$^b$ to initiate such operation. With contacts 67$^a$ and 66$^b$ of switches 67 and 66 closed, a circuit is completed from terminal 69 of rectifier bridge 71, through bus 46, contacts 67$^a$, reference winding 59, resistor 64, reference winding 58, adjustable resistor 65, contacts 66$^b$ and bus 47 back to terminal 70 of the rectifier bridge. Consequently, amplifier 19 will be turned on and amplifier 16 will be turned "full-off." With output voltage being developed across terminals 24 and 18 of amplifier 19, current will flow from terminal 24 through rectifier 29, regulator winding 26 of amplifier 12, rectifier 31, field winding section F2 and resistor 17 to output terminal 18. As a result the forward field ampere turns decay and the reverse field ampere turns build up. The motor momentarily coasts until the reverse field ampere turns exceeds the forward ampere turns, whereupon the direction of motor C. E. M. F. reverses polarity to that of the applied armature voltage. Consequently, a high current circulated in the motor armature and magnetic amplifier 12 loop and this provides a braking torque which rapidly decelerates the motor to zero speed whereupon the motor immediately accelerates in the "reverse" direction under control of amplifiers 19 and 12 in the same manner hereinbefore described in connection with the "forward" operation of the motor.

Rectifier 63 blocks reverse current flow through signal control windings 56 and 57 of amplifiers 16 and 19 during deceleration in the aforedescribed reversing operation.

As aforementioned during quick reversing operation a high regenerative braking current will circulate in the motor armature loop circuit following build-up of the opposite direction motor field flux. In the case of motors of smaller horsepower ratings such high current may not be serious. However, with motors of large horsepower such current can be deleterious, and the system to be described in connection with Fig. 3 provides means for automatically limiting the value of this regenerative braking current during reversing operation.

In the system of Fig. 3, elements which are like those of Fig. 1 and have like connections in the system are given the same reference numerals to simplify the description. Magnetic amplifiers 100 and 101 correspond to and are like amplifiers 16 and 19 of Fig. 1, except for additionally having current limit control windings 102 and 103, respectively.

Tht armature A of motor M is connected across the output terminals 104 and 105 of a magnetic amplifier 106 in series with a load resistor 107 and in series with a dynamic braking resistor 108 which is normally shunted by normally closed contacts DB2 of an electro-responsive relay DB which has an operating coil DB1. Amplifier 106 is provided with A. C. input terminals 109 and 110 to which are connected secondary winding 32$^b$ of transformer 32. Terminal 109 is connected in series with a half-wave rectifier 111 to output terminal 104, and input terminal 110 is connected in series with one A. C. main winding 112, a half-wave rectifier 113, a resistor 114 and a half-wave rectifier 115 to output terminal 104. Output terminal 105 is connected in series with a half-wave rectifier 116 to A. C. input terminal 109, and is also connected in series with a half-wave rectifier 117, resistor 118 and a half-wave rectifier 119 and a second A. C. main winding 120 to A. C. input terminal 110. The point common between resistor 114 and rectifier 115 is connected by a conductor 121 to the point common between rectifiers 117 and resistor 118. The point common between rectifier 113 and resistor 114 is connected to a terminal 122, and similarly the point common between resistor 118 and rectifier 119 is connected to a terminal 123. Amplifier 106 is also provided with a regulating control winding 124, a bias control winding 125 and a current limit control winding 126. Winding 124 is connected at one end to terminal 25 of rectifier bridge 21 and is connected at its other end to terminal 27 of this rectifier bridge. Bias control winding 125 is connected across the D. C. lines 46 and 47 in series with adjustable resistor 45, and current limit control winding 126 is connected to the output terminals 127 and 128 of a magnetic amplifier 129 which derives its A. C. supply from a transformer 130.

The aforementioned current limit control windings 102 and 103 of amplifiers 100 and 101 are connected in series across the output terminals 131 and 132 of a magnetic amplifier 133 which derives its A. C. supply from a transformer 134. Control winding DB1 of relay DB is connected across the output terminals 135 and 136 of a magnetic amplifier 137 which derives its A. C. supply from a transformer 138. The power connections between the respective A. C. input and output terminals of amplifiers 129, 133 and 137, inclusive of A. C. main windings, rectifiers, etc., are exactly like those of amplifiers 100 and 101 and corresponding elements have been given identical reference numerals.

Amplifiers 129, 133 and 137 are provided with current limit control windings 139, 140 and 141, respectively, which windings are connected in series across the load resistor 107 in the loop circuit of motor armature A and the amplifier 106. Amplifier 129 is provided with a bias control winding 142 which is connected in series with an adjustable resistor 143 across D. C. buses 46 and 47, and amplifier 133 has a bias control winding 144 connected in series with an adjustable resistor 145 across buses 46 and 47. Similarly, amplifier 137 has a bias control winding 146 which is connected in series with an adjustable resistor 147 across the D. C. buses. Amplifiers 133 and 137 have current limit nullifying windings 148 and 149, respectively, which are connected in series across the terminals 122 and 123 of amplifier 106.

The ampere turns developed by bias windings 142, 144 and 146 of amplifiers 129, 133 and 137, respectively, are each adjusted for some given value beyond cut-off of these amplifiers. With the motor M running at base speed and rated load the ampere turns developed in current limit nullifying windings 148 and 149 should just counteract the ampere turns developed by current limit control windings 140 and 141, thereby maintaining amplifiers 133 and 137 beyond cut-off.

Assume that motor M is running at base speed with rated load in the "forward" direction, and switches 66 and 67 are operated as before described in connection with the system of Fig. 1 to effect "reverse" operation of the motor. When the ampere turns provided winding section F2 exceeds the ampere turns provided by section F1, the induced motor armature voltage reverses and the aforementioned large regenerative braking current will circulate clockwise in the motor armature and amplifier 106 loop, and internally of amplifier 106 such current flows from terminal 105 through rectifiers 116 and 111 to terminal 104 and also from terminal 105 through rectifier 117, conductor 121 and rectifier 115 to terminal 104. Since the field current now is below the value required to turn on amplifier 106, no current flows through load resistors 114 and 118, nor through current limit nullifying windings 148 and 149, and the ampere turns developed by current limit control windings 140 and 141 therefore are effective to turn amplifiers 133 and 137 on. With amplifier 133 turned on, ampere turns are developed in current limit control windings 102 and 103 of amplifiers 100 and 101. The ampere turns thus developed in winding 102 are of a direction to turn this amplifier further off. However in the case of the ampere turns developed in winding 103 they act cumulatively with the ampere turns of signal winding 57 to hold down the rate of rise of output voltage of amplifier 101. Consequently, the output voltage of amplifier 101, the attendant reverse field flux, and magnitude of ampere turns developed in regulating control winding 124 of amplifier 106 are held down so that the regenerative braking current is held within safe limits.

Under such condition amplifier 137 also turns on to energize control winding DB1 of relay DB, which results in opening of contacts DB2 and in the inclusion of resistor 108 in the loop circuit of the motor armature and amplifier 106. The inclusion of resistor 108 permits an increase in the reverse motor field flux for a given value of armature current and thus increases the regenerative deceleration braking torque of the motor.

When the motor approaches zero speed, the regenerative deceleration braking current ceases permitting a building of arm-voltage by magnetic amplifier 106. Consequently, the current limit windings 140 and 141 are counteracted by the ampere turns of current limit nullifying windings 148 and 149, respectively, thereby effecting turn-off of amplifiers 133 and 137. Then due to increase in output voltage of amplifier 106, the motor will accelerate to speed in the "reverse" direction. If the current in the motor armature and amplifier 106 loop should tend to rise too high, the ampere turns developed in current limit windings 139 will turn "on" amplifier 129 to develop ampere turns in current limit winding 126 of amplifier 106 which counteract the ampere turns of regulating control winding 124. This results in a hold down of the output voltage of the amplifier 106 so that the value of current in the motor armature and amplifier 106 loop circuit is held within predetermined safe limit.

As will be understood the aforedescribed action of amplifiers 129, 133 and 137 will also occur when going from "reverse" to "forward" operation of the motor.

The modified form disclosed in Fig. 4 is very similar to that of Fig. 3, except that the dynamic braking resistor 108 and relay DB controlling the shunting and effecting insertion of resistor 108 in the motor armature and amplifier 106 loop circuit is dispensed with, and replaced by an eddy current brake or magnetic particle brake B, mechanically connected to the shaft of motor M and having an energizing winding W. The winding W is connected across output terminals 135 and 136 of amplifier 137, and will be energized whenever amplifier 137 is turned on, as before described in connection with Fig. 3, thereby causing brake B to exert braking torque on the shaft of motor M during regenerative operation of the motor drive.

The modified form of drive system depicted in Fig. 5 functions similarly to that of Fig. 3, but dispenses with the use of the three current limit amplifiers and substitutes therefor certain relays and connections that will now be described. The fixed resistor 64 is normally shunted by the contacts FD3 of a relay FD which has electro-responsive control windings FD1 and FD2. Winding FD1 is connected in series with an adjustable resistor 155 across terminals 122 and 123 of amplifier 106. Winding FD2 is connected at one end to the point common between resistor 107 and the armature A of the motor and is connected at its other end in series with an operating winding DBR2 of a dynamic braking relay DBR to the point common between output terminal 104 of amplifier 106 and resistor 107. Relay DBR has another electro-responsive winding DBR1 which is connected in series with an adjustable resistor 156 across terminals 122 and 123 of amplifier 106, and said relay contacts DBR3 which are operated to shunt resistor 108 in and out of the motor armature and amplifier 106 loop circuit.

Current limit winding 126 of amplifier 106 is connected across resistor 107 in series with the resistor element 157a of a potentiometer 157 and a half-wave rectifier 158. A full-wave rectifier bridge 159 is connected at its positive D. C. terminal to adjusting element 157b of potentiometer 157 and is connected at its negative D. C. terminal to the point common between resistor element 157ᵃ and rectifier 158. A transformer 160 is connected to the A. C. terminals of bridge 159 to supply the same with A. C.

It will be apparent that the current flow through winding FD1 and FD2 will be in opposition and it may be assumed that under normal running conditions they counteract each other and contracts FD3 remain in their normally closed position. However, during quick reversing operation current will cease to flow through winding FD1 when regenerative braking current is flowing in the motor armature loop circuit and winding FD2 will then be effective to open contacts FD3 and insert resistor 64 in the energizing circuit for reference windings 58 and 59 of amplifiers 16 and 19. The then effective one of amplifiers 16 and 19 will be decreased in voltage output to hold down the current flowing through its associated field winding section and regulating control winding 124 of amplifier 106. At, or near the same time, the winding DBR1 is similarly rendered ineffective and winding DBR2 then opens contacts DBR3 to include resistor 108 in the loop circuit of the motor armature for the purpose hereinbefore described in connection with Fig. 2. When amplifier 106 again becomes sufficiently conductive relays FD and DBR will resume their normal conditions depicted, due to the reenergization of their winding FD1 and DBR1, respectively. Adjustable resistors 155 and 156 afford means for dependently adjusting the operating points of relays FD and DBR.

Potentiometer 157, full-wave rectifier bridge 159 and the associated A. C. supply of the latter provide a "spill-over" circuit whereby current flow through current limit control winding 126 is cut-off until the voltage drop from the right hand end of resistor element 157ᵃ to adjusting element 157ᵇ exceeds the voltage drop across resistor 107 in the motor armature loop-circuit. Current limit winding 126 when energized of course acts to hold down the output voltage of amplifier 106 as aforedescribed in connection with Fig. 3.

I claim:

1. A reversible adjustable voltage drive comprising a D. C. motor having a pair of shunt field windings energizable to effect reverse rotations of said motor, an amplifier having its output terminals connected in a loop circuit with the motor armature and having control means responsive to a D. C. input signal, second and third amplifiers, each of which has its output terminals in circuit with an associated one of the motor field windings and with the control means of the first mentioned amplifier, and each of which has input control means for controlling the energization of its associated motor field winding and said control means of said first mentioned amplifier.

2. A reversible adjustable voltage drive comprising a D. C. motor having a pair of shunt field windings energizable to effect reverse rotations of said motor, a magnetic amplifier having its output terminals connected in a loop circuit with the motor armature and having a control winding, and second and third magnetic amplifiers, each of which has its output terminals in circuit with an associated one of the motor field windings and with said control winding of the first mentioned amplifier, and each of which has input control means for controlling the energization of its associated motor field winding and the control winding of said first mentioned amplifier.

3. The combination according to claim 2 wherein the circuit connections of the output terminals of said second and third amplifiers, with said motor field windings, and said control winding of the first mentioned amplifier include means to insure that current flowing through either field winding section always flow through said control winding in the same direction.

4. The combination according to claim 3 wherein said input control means of each said second and third amplifier comprises a D. C. reference control winding and a D. C. signal control winding responsive to the output voltage of said first mentioned amplifier.

5. The combination according to claim 4 together with means operable to condition the input control means of one of said second and third amplifiers to effect the aforementioned control, and to simultaneously condition the input control of the other of the last mentioned amplifiers to turn it full-off.

6. The combination according to claim 5 wherein said input control means of said second and third amplifiers includes means to adjust current flow through said D. C. reference windings.

7. The combination according to claim 6 wherein a half-wave rectifier is connected in series with said D. C. signal control windings across the output terminals of said first mentioned amplifier.

8. A reversible adjustable voltage drive comprising a D. C. motor having a pair of shunt field windings energizable to effect reverse rotation of said motor, a magnetic amplifier having its output terminals connected in a loop circuit with the motor armature and having a control winding, second and third magnetic amplifiers, each of which has its output terminals in circuit with an associated one of the motor field windings and with the control winding of the first mentioned amplifier, and each of which has a reference control winding, a signal control winding responsive to the output voltage of the first mentioned amplifier and a current limit control winding, and means in circuit with said loop circuit, the A. C. circuit of said first mentioned amplifier, and said current limit control windings of said second and third amplifiers to energize the latter windings in accordance with the difference in alternating current flowing in said first mentioned amplifiers and the direct current flowing in said loop circuit.

9. The combination according to claim 8 wherein said means comprises a resistor in said loop circuit and a fourth magnetic amplifier having a current limit control winding connected across said resistor and having a current limit nullifying control winding subjected to a unidirectional potential which is a function of the alternating current flow in said first mentioned amplifier.

10. The combination according to claim 8 together with means energizable to increase the braking torque of said motor and means in circuit with last recited means, said loop circuit, and the A. C. circuit of said first mentioned amplifier to energize said last recited means whenever the current flow in said loop circuit exceeds the flow of A. C. in said first mentioned amplifier by some predetermined amount.

11. The combination according to claim 10 wherein said last recited means comprises a resistor in the loop circuit of said motor and an electro-responsive relay having contacts normally shunting said resistor and wherein the last specified means energizes said relay under the conditions aforestated to effectively include said resistor in said loop circuit.

12. The combination according to claim 10 wherein said last recited means comprises an electro-responsive brake means connected to the shaft of said motor and affording braking torque in accordance with the energization of a control winding thereof.

13. A reversible adjustable voltage drive comprising a D. C. motor having a pair of shunt field windings energizable to effect reverse rotation of said motor, a magnetic amplifier having its output terminals connected in a loop circuit with the motor armature and having a regulating control winding and a current limit control winding, a second and third magnetic amplifier, each of which has it output terminals connected in circuit with an associated one of the motor field windings and with said regulating control winding of the first mentioned amplifier, and each of which has control means for controlling the energization of its associated motor field winding and said control winding of said first mentioned amplifier, and means in circuit with said loop circuit and the current limit control winding of said first mentioned amplifier for energizing the latter winding in accordance with the current flow in said loop circuit above some predetermined minimum value.

14. The combination according to claim 13 wherein the last mentioned means comprises a resistor in said loop circuit and a magnetic amplifier having a control winding connected across said resistor and having its output terminals connected in circuit with the current limit control winding of the first mentioned amplifier.

15. A reversible adjustable voltage drive comprising a D. C. motor having a pair of shunt field windings energizable to effect reverse rotations of said motor, first and second control means each of which is in circuit with an associated one of said field windings and each of which is energizable to supply current to its associated field winding, a third control means in circuit with the armature of said motor and means in circuit with said field windings and said third control means to energize said third control means to supply appreciable current to the armature of said motor only when the current supplied to either of said field windings exceeds an amount insuring substantial field flux.

References Cited in the file of this patent

UNITED STATES PATENTS

| | | |
|---|---|---|
| 2,677,088 | Malick | Apr. 27, 1954 |
| 2,708,260 | Comstock | May 10, 1955 |